(12) United States Patent
Suvakovic et al.

(10) Patent No.: US 8,879,914 B2
(45) Date of Patent: Nov. 4, 2014

(54) LOW-ENERGY OPTICAL NETWORK ARCHITECTURE

(75) Inventors: Dusan Suvakovic, Pleasanton, CA (US); Doutje Van Veen, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 926 days.

(21) Appl. No.: 13/033,379

(22) Filed: Feb. 23, 2011

(65) Prior Publication Data

US 2011/0206370 A1  Aug. 25, 2011

Related U.S. Application Data

(60) Provisional application No. 61/307,230, filed on Feb. 23, 2010.

(51) Int. Cl.
- *H04J 14/00* (2006.01)
- *H04L 12/24* (2006.01)
- *H04B 10/272* (2013.01)
- *H04Q 11/00* (2006.01)

(52) U.S. Cl.
CPC .... *H04L 41/0833* (2013.01); *H04Q 2011/0064* (2013.01); *H04B 10/272* (2013.01); *H04Q 11/0067* (2013.01); *H04Q 2011/0086* (2013.01); *H04Q 2011/0079* (2013.01); *H04L 41/0668* (2013.01); *H04L 41/0896* (2013.01)
USPC ................. 398/72; 398/68; 398/70; 398/71; 398/57; 398/33; 398/48; 398/49; 398/3; 398/5; 370/352; 370/392; 370/389; 370/468

(58) Field of Classification Search
USPC ......... 398/1, 2, 3, 4, 5, 66, 67, 68, 70, 71, 72, 398/98, 99, 100, 58, 15, 17, 25, 33, 22, 23, 398/24, 45, 48, 49, 57, 34; 370/352, 392, 370/465, 389, 468, 464, 535
See application file for complete search history.

(56) References Cited

U.S. PATENT DOCUMENTS

| | | | | |
|---|---|---|---|---|
| 7,865,077 B2 * | 1/2011 | Mukojima | ........................ | 398/1 |
| 2007/0058973 A1 * | 3/2007 | Tanaka | ............................... | 398/1 |

\* cited by examiner

*Primary Examiner* — Hanh Phan
(74) *Attorney, Agent, or Firm* — S. Wyse (57) ABSTRACT

A method and apparatus for controlling traffic in an optical network having a plurality of OLTs for communicating with a plurality of PONs. A traffic controller receives traffic information concerning current traffic volume and, preferably with reference to a rules database, calculates the number of OLTs required to support the current traffic volume. A separate determination may be made whether a network reconfiguration is permitted at this time. If a reconfiguration is permitted, the traffic controller configures a traffic control switch to route the PON traffic to an from only the calculated number of OLTs. The traffic control switch may be implemented using a voltage-controlled optical fiber coupling or electronically, routing the traffic as electrical signals to and from electro-optical converters associated with each PON. The OLTs to be used may be selected by the traffic controller. The method and apparatus may also be used for fault management to route PON traffic through operational components when a failure of other components in the network is detected.

5 Claims, 9 Drawing Sheets

LOW-ENERGY OPTICAL NETWORK ARCHITECTURE

CROSS-REFERENCE TO RELATED APPLICATIONS

The present disclosure is related to and claims priority from U.S. Provisional Patent Application Ser. No. 61/307,230, entitled Aggregated, Low-Energy PON Architecture and filed on 23 Feb. 2010, the entire contents of which are incorporated by reference herein.

TECHNICAL FIELD

The present invention relates generally to the field of optical communication networks, and, more particularly, to a method and apparatus for conserving power consumption in an optical network such as a PON.

BACKGROUND

The following abbreviations are herewith defined, at least some of which are referred to within the following description of the state-of-the-art and the present invention.
APON ATM PON
ATM Asynchronous Transfer Mode
CO Central Office
EPON Ethernet PON
GPON Gigabit PON
IEEE Institute of Electrical and Electronics Engineers
ITU International Telecommunication Union
OLT Optical Line Terminal
ONT Optical Network Terminal
ONU Optical Network Terminal
PON Passive Optical Network
TDMA Time Division Multiple Access Passive optical network (PON) is a widely used technology for residential and business broadband access. PONs are considered to be inexpensive for network operators because they do not require any active equipment or power supplies between the operator's central office (CO) and customer's premises (CP). PON traffic flows between the Optical Line Terminal (OLT) residing in the CO towards a number of Optical Network Terminals (ONT) or Optical Network Terminals (ONU), residing on the CP.

The OLT is the only unit transmitting in the downstream direction. The upstream PON traffic shares the same optical fiber with the downstream traffic, utilizing a different wavelength and is driven by all ONTs. In order to prevent collisions that may occur if two or more ONTs are transmitting simultaneously, upstream PON traffic is managed in the Time Division Multiple Access (TDMA) fashion. One of the functions of the OLT is to schedule and grant separate time slots to each ONT, thus avoiding collision between upstream packets. Transmitter lasers (or other light sources) of each ONT can be turned on only during their respective transmission time slots. The OLT must be capable of receiving bursts of data from different ONTs.

The evolution of the PON systems and standards has seen a steady increase in PON bit rate ranging from the initial 155 Mb/s in APON, to 1.25 Gb/s in Gigabit-capable PON (GPON) as specified in ITU-T G.984 and Ethernet PON (EPON) as specified in IEEE 802.3ah, up to 10 Gb/s currently specified in the IEEE 802.3av (10GEPON) and ITU-T 10G GPON standards. The high bit rates result in increased energy consumption in both the OLT and ONT, posing a challenges for the implementation of central office equipment including cooling issues caused by increased power dissipation and operational expenses incurred by increasing electrical energy consumption.

Note that the techniques or schemes described herein as existing or possible are presented as background for the present invention, but no admission is made thereby that these techniques and schemes were heretofore commercialized or known to others besides the inventors.

Accordingly, there has been and still is a need to address the aforementioned shortcomings and other shortcomings associated with energy use in optical networks. These needs and other needs are satisfied by the present invention.

SUMMARY

The present invention is directed to a manner of controlling optical networks in an energy efficient manner that may also be advantageously applied to failure management. In one aspect, the present invention is a method of controlling traffic in an optical network, including calculating the current network traffic volume, calculating the number of OLTs required to support the traffic volume, configuring a traffic control switch to route traffic to PONs in the optical network using only the calculated number of OLTs, and powering down the OLTs not being used to route traffic. A rules database may be maintained in a traffic controller for making the calculation, and also in some embodiments for determining whether a network reconfiguration is to be performed at this time.

Additional aspects of the present invention are contemplated. In one aspect, the present invention is a method for saving energy in the PON CO using a traffic control switch. In another aspect the invention is a CO configuration with a traffic control switch. In yet another aspect, the present invention is a traffic control switch having logical architecture in accordance with the description above. Embodiments of the present invention may include a traffic control switch based on optical signal switching or based on electrical signal switching. In yet another aspect, the present invention may be a traffic control switch for managing OLT/PANU failure events by introducing OLT/PANU redundancy and by real-time traffic re-direction from failed to functional OLT/PANU equipment, a network employing such a switch, or a method of managing OLT/PANU failure in an optical network.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of controlling optical networks in an energy efficient manner that may also be advantageously applied to failure management.

Figure 1:
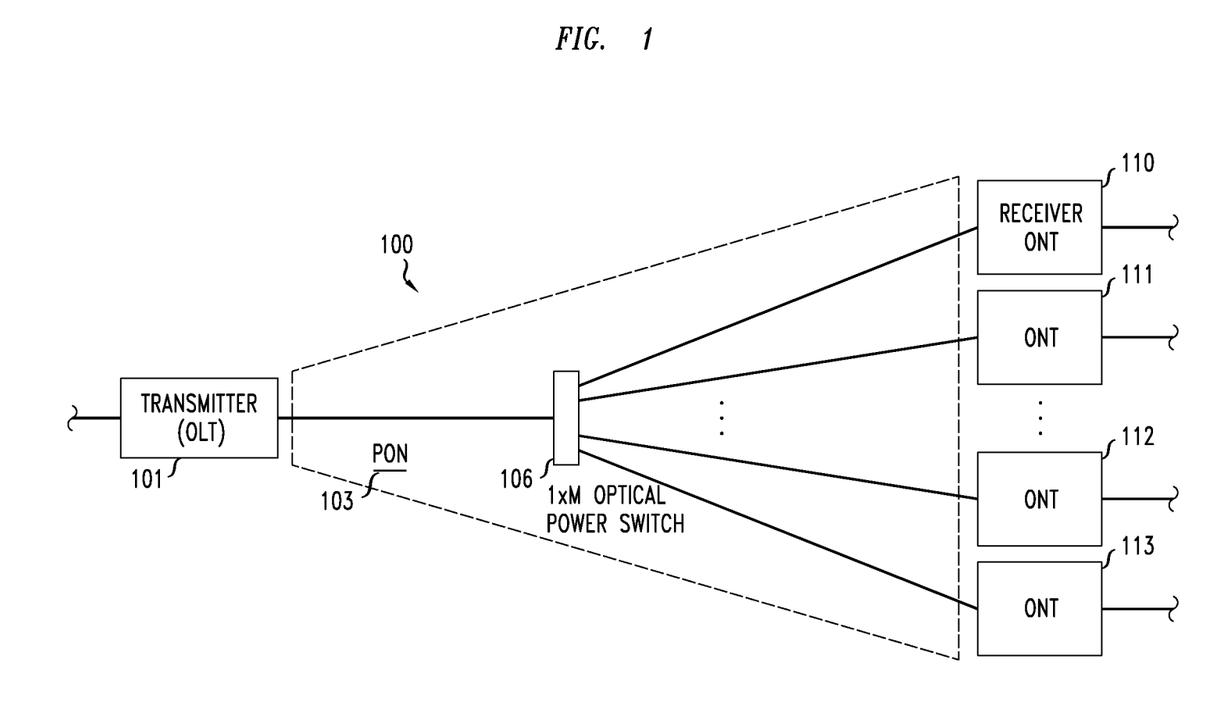
FIG. 1 is a simplified schematic diagram illustrating selected components of a typical optical network according to the existing art.

FIG. 1 is a simplified schematic diagram illustrating selected components of a typical optical network 100 according to the existing art. Depicted in FIG. 1 are four ONTs referred to as 110 through 113 that represent the devices typically located at their respective customer's premises and are connected to a device or network of devices (not shown) located, for example, in a residence or small business. Content is transmitted to and from the ONTs via a PON 103, which includes a fiber optic cable extending to each ONT from, in this example, an optical splitter 106. As implied in FIG. 1, there may be and often are more than four ONTs associated with a single splitter, and splitter 106 is therefore labeled as a 1×M optical power splitter (with M corresponding to the number of fibers on the downstream side of the splitter).

In the example of FIG. 1, optical splitter 106 is connected to OLT 101 by a single fiber optic cable. As should be apparent, the optical signals between the ONT 101 and the ONTs 110 through 113 are separated or combined for, respectively, communications in the downstream or upstream direction. Note that here, the PON 103 delineated by a broken line is considered the portion of the network 100 between and connecting OLT 101 with ONTs 110 though 113. PON 103, like optical network 100, may contain additional components in some applications.

Figure 2:
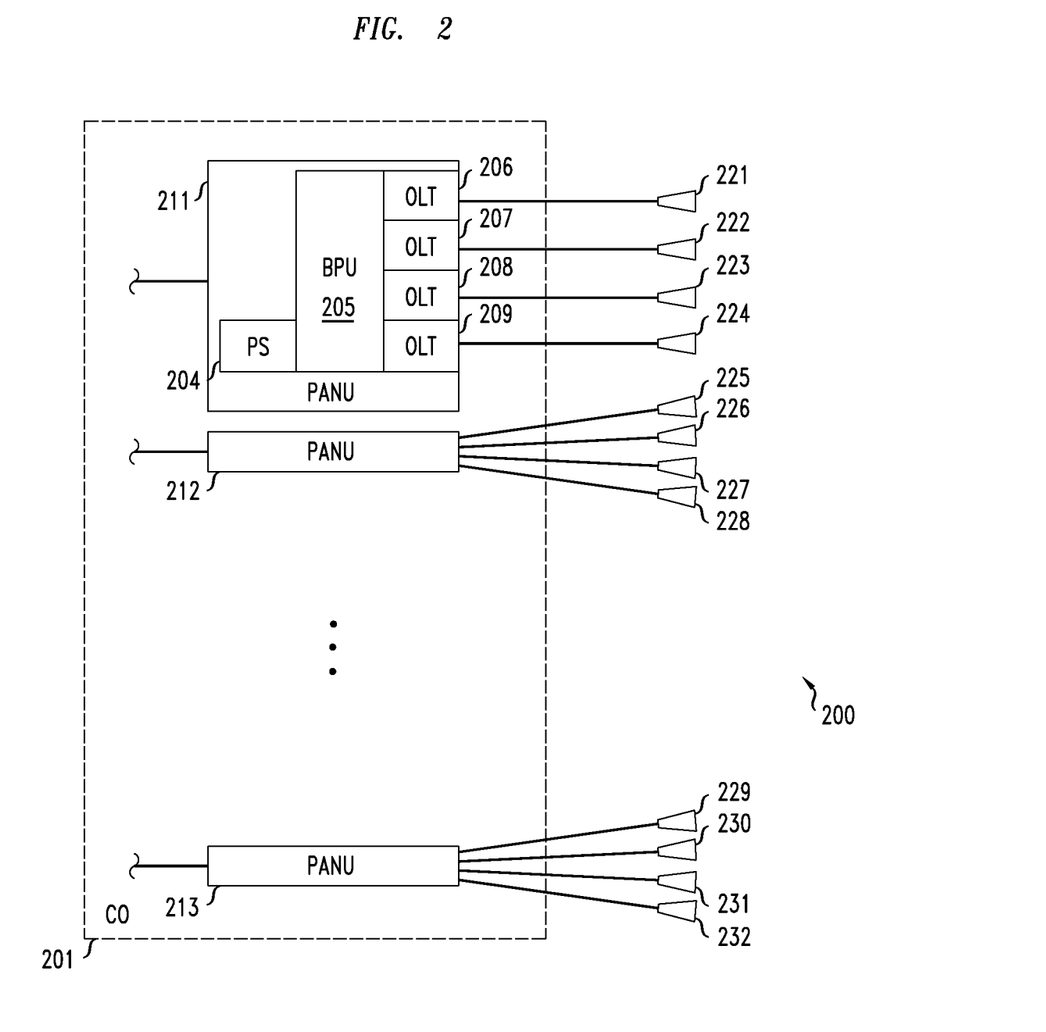
FIG. 2 is a simplified schematic diagram illustrating selected components of a typical optical network according to the existing art.

FIG. 2 is a simplified schematic diagram illustrating selected components of a typical optical network 200 according to the existing art. As should be apparent, many components of FIG. 2 are analogous if not identical to those illustrated in FIG. 1. In the network 200 of FIG. 2 a CO 201 includes a plurality of PON access network units (PANU), referred to as 211 through 213. As is implied in FIG. 2, there may be many more such units implemented in a CO such as CO 201. Each PANU in this exemplary network is associated with a number of PONS (such as PON 103 illustrated in FIG. 1). Here, PANU 211 is associated with PONS 221 through 224, PANU 212 is associated with PONS 225 through 228, and PANU 213 is associated with PONS 229 through 232.

For the purposes of illustration, several components of PANU 211 are depicted in FIG. 2. Four OLTs, referred to as 206 through 209, are each respectively associated with one of PONs 221 through 224. A backend processing unit (BPU) 205 routes traffic for each PON to the appropriate OLT. Power supply (PS) 204 provides power as needed by the components of PANU 211. The PANUs 212 and 212 may include the same or similar components, although for simplicity they are not shown in FIG. 2. Note that in network 200 of FIG. 2, each OLT is responsible for the communications with a single PON (which in turn serves a plurality of customers). Each OLT much therefore be powered up all of the time unless a planned or unplanned outage removes service to the PON is serves. During times when network traffic is minimal, this represents an unnecessary consumption of energy. A manner of mitigating this inefficiency according to the present invention will now be described.

Figure 3:
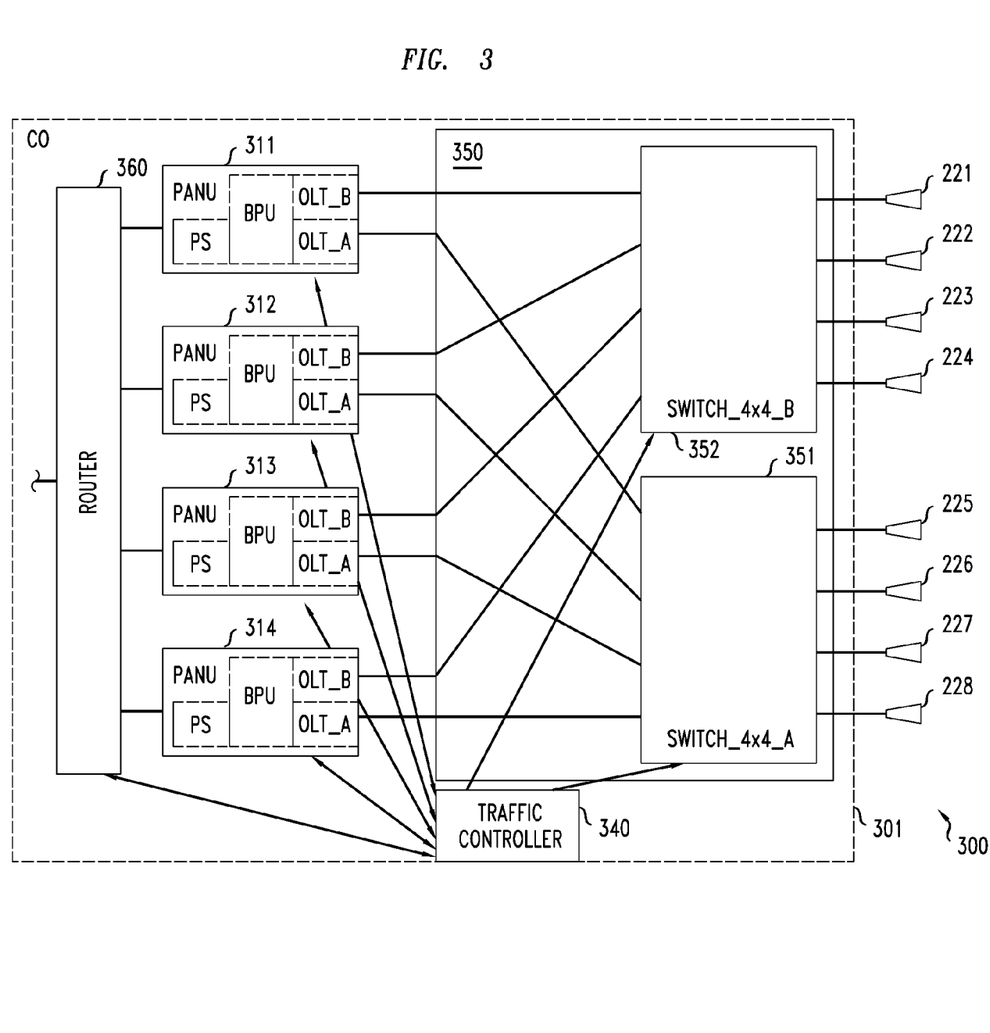
FIG. 3 is a simplified schematic diagram illustrating an optical network according to an embodiment of the present invention.

FIG. 3 is a simplified schematic diagram illustrating an optical network 300 according to an embodiment of the present invention. In network 300, as depicted in FIG. 3, central office 301 includes four PANUs referred to respectively as 311 through 314. A router 360 directs incoming and outgoing communications to and from PANUs 311 through 314. Each of the PANUs 311 through 314 includes a BPU and a PS, as described above in reference to PANU 211 of FIG. 2, and a plurality of ONTs. In the embodiment of FIG. 3, however, each PANU is for simplicity depicted as having only two ONTs, referred to in each case as ONT_A and ONT_B. Rather than being associated with a single PON, however, each ONT communicates with traffic control switch 350.

In accordance with this embodiment of the present invention, traffic control switch 350 routes the traffic to and from each PON in such a manner that one ONT may be used to communicate with more than one PON, as will be described in more detail below. In this embodiment, switch 350 includes a traffic control switch 351 associated with PONs 225 through 228 and traffic control switch 532 is associated with PONs 221 through 224. Switches 351 and 352 are referred to in FIG. 3 as A and B representing the OLTs with which they communicate. Traffic control switch 351 is connected to the OLT_A in each of PANUs 311 through 314, and correspondingly traffic control switch 352 is connected to each of the OLT_Bs.

In accordance with the present invention, traffic controller 340 monitors the traffic in the optical network 300 and determines how many OLTs are required to support the current traffic flow. It may then instruct traffic control switches 351 and 352 of switch 350 to route all traffic through less then all of the OLTs to which it is connected. It then notifies each of the PANUs of CO 301 to shut down selected OLTs and route the traffic through the remaining (active) OLTs. Router 360 is also notified so that traffic may be routed to the PANU or PANUs with active OLTs. Router 360 includes routing tables associated with each of the PONs, and in accordance with the present invention the routing tables are updated to indicate the active OLT associated with each PON serviced.

In accordance with the present invention, the traffic controller, for example traffic controller 340 of FIG. 3, has several function as described herein. The traffic controller may be implemented as a physical processor executing instructions stored as software in a non-transitory medium. In other embodiments, the traffic controller may be implemented as a combination of executable software and hardware such as an ASIC. The traffic controller may be a standalone device or incorporated in a multifunction apparatus that performs other duties as well. It is preferably located in the CO of the optical network.

Figure 6:
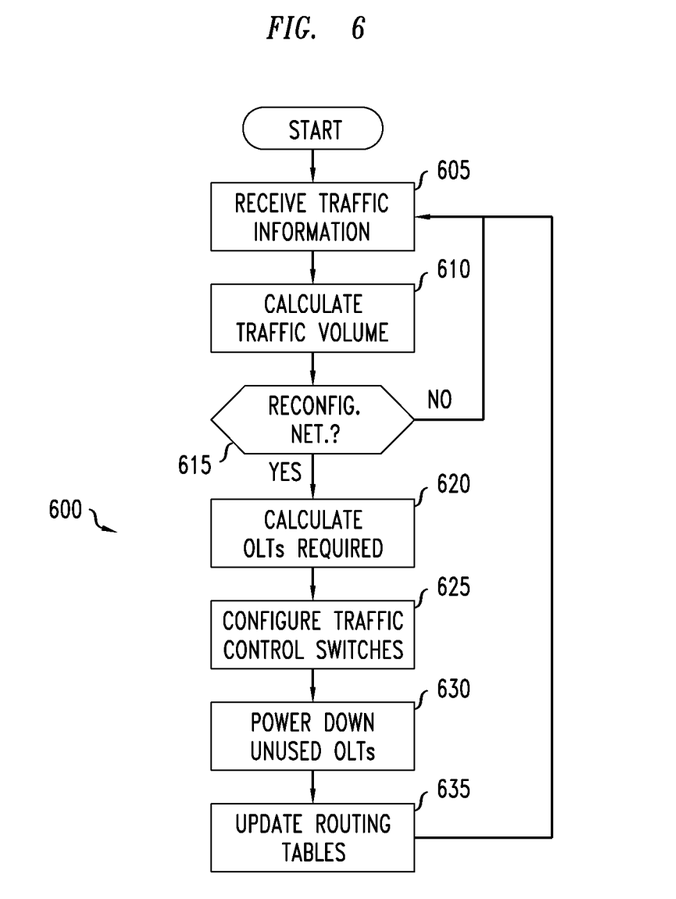
FIG. 6 is a flow diagram illustrating a method 600 of controlling traffic in an optical communication network according to an embodiment of the present invention.

FIG. 6 is a flow diagram illustrating a method 600 of controlling traffic in an optical communication network according to an embodiment of the present invention. At START it is presumed that the components for performing the method 600 are available and operational according to at least this embodiment of the present invention. The process then begins when network traffic information in received (step 605) at the traffic controller. This traffic information may be received from the PANUs of the network, for example, or from the traffic-control switches configured according to the present invention. Note that traffic information may be monitored and transmitted continuously or it may be buffered at collection points and transmitted to the traffic controller periodically, or alternately upon the occurrence of a predetermined event.

In this embodiment, when traffic information is received at the traffic controller, the traffic volume is calculated (step 610). Generally, the network traffic volume will be calculated as an average over a period of time, but other methods may be used as well. A determination may then be made as (step 615) as to when a network reconfiguration is required. This determination may be made on a periodic basis, or whenever a new traffic volume calculation becomes available. The determination is generally made by comparing the calculated traffic volume to a set of rules maintained by the traffic controller. Preferably, the rules are established to require configuration changes only when current network traffic cannot adequately be supported by the current configuration, or when conditions have changed significantly since current configuration was set. In other words, frequent changes in network configuration to accommodate relatively small changes in traffic volume are not desirable in most implementations.

In the embodiment of FIG. 6, if it is determined at step 615 that no network reconfiguration is needed, then the process simply returns to step 605 and continues to receive traffic information as it is transmitted. If, on the other hand, a determination is made that a network reconfiguration is required, then a calculation is made (step 620) of the minimum number of OLTs required to support the measured traffic volume. This calculation is preferably again made with reference to a rules database, which in a preferred embodiment would take into account a safety margin and, in some implementations, the expected future traffic volume as well. That is, the calculation of the minimum number of OLTs required may involve other factors than simply the current traffic volume only.

In this embodiment, when the minimum OLT calculation is made, the traffic controller directs the traffic control switches to route traffic to only the minimum number of OLTs (step 625). The OLTs not in use are then powered down (step 630) to conserve the power that would otherwise be consumed in their operation. The traffic routing tables are then updated (step 635) so that traffic is routed though only those OLTs that are powered up. The process then returns to step105 and the network traffic is monitored so that the network may be reconfigured as necessary.

Note that the method 600 of FIG. 6 is exemplary, and some variation is possible without departing form the spirit of the present invention. Additional operations may be performed, for example, and in some embodiments operations may be omitted. In addition, the steps of method 600 may be performed in any logically-consistent order.

Figure 4A:
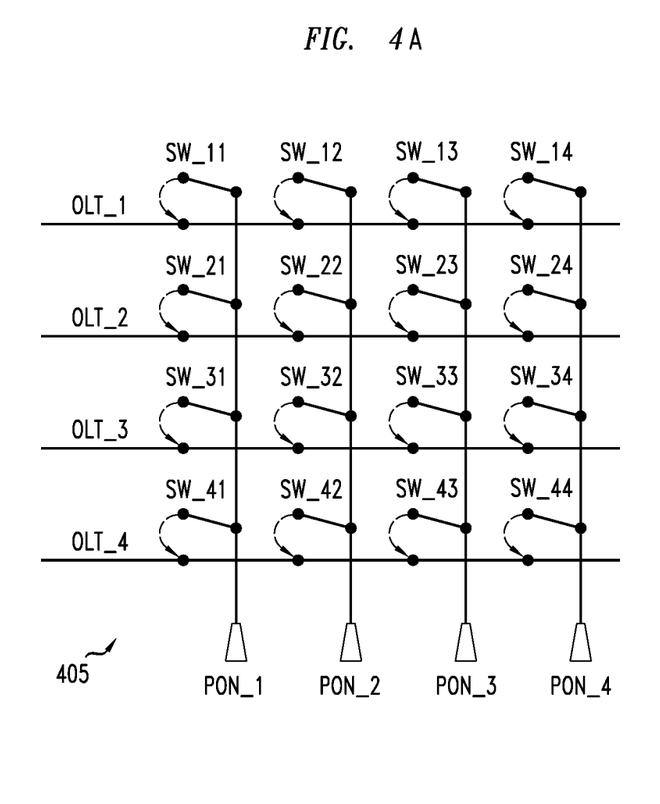
FIGS. 4A and 4B are simplified schematic diagrams illustrating two logical architectures that may be used for a traffic control switch according to respective embodiments of the present invention.
Figure 4B:
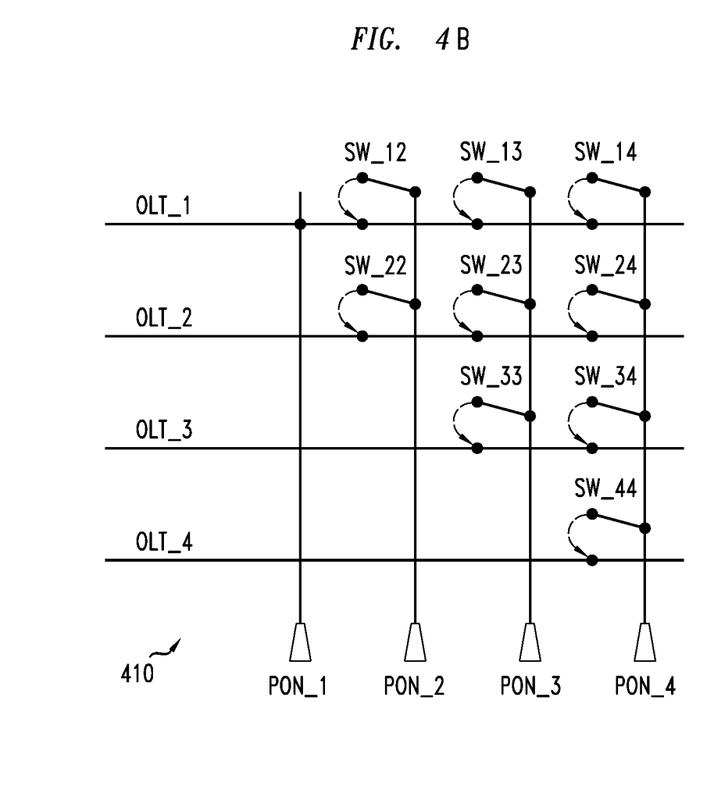

FIGS. 4A and 4B are simplified schematic diagrams illustrating two logical architectures that may be used for a traffic control switch according to respective embodiments of the present invention. In each of these FIGS., four OLTs are available to drive one or more of four PONs, as is required for example in the embodiment of FIG. 3. Note that these are merely two exemplary architectures for use in a 4×4 traffic control switch, other variations may be used as well. In addition, a traffic control switch according to the present invention may in some cases be re-configurable to adopt a different architecture.

In the embodiment of FIG. 4A, switch 405 is illustrated as a crossbar switch that allows any and all of the PONs to be connected to any one of the OLTs. This switch architecture provides maximal flexibility and the greatest number of choices for the network operator, which can be particularly beneficial in handling random failures of PANU equipment. The complexity of the switch 405, however, is higher than necessary for implementation of the energy saving feature. This may be illustrated by reference to the switch 410 shown in FIG. 4B. The architecture of switch 410 also allows all PONs to be connected to one, two, three, or four different OLTs, but provides only one way to achieve each one of these configurations.

For example, if the traffic controller determines that all four PONs are to be connected to one OLT, using the architecture of switch 410 this will be OLT__1. If all PONs are instead to be connected to two different OLTs, these must be OLT__1 and OLT__2, and so forth. Note that PON__1 in FIG. 4B is in essence dedicated to OLT__1, because it is driven by that OLT in all possible configurations of the switch. As alluded to above, this architecture reduces the complexity of switch 410, as compared for example to switch 405 of FIG. 4A, but also reduces flexibility in operation. Note that any switch architecture providing more connecting options than that shown in FIG. 4B, but fewer than that in FIG. 4A may be employed to provide the advantages of the present invention.

Figure 5:
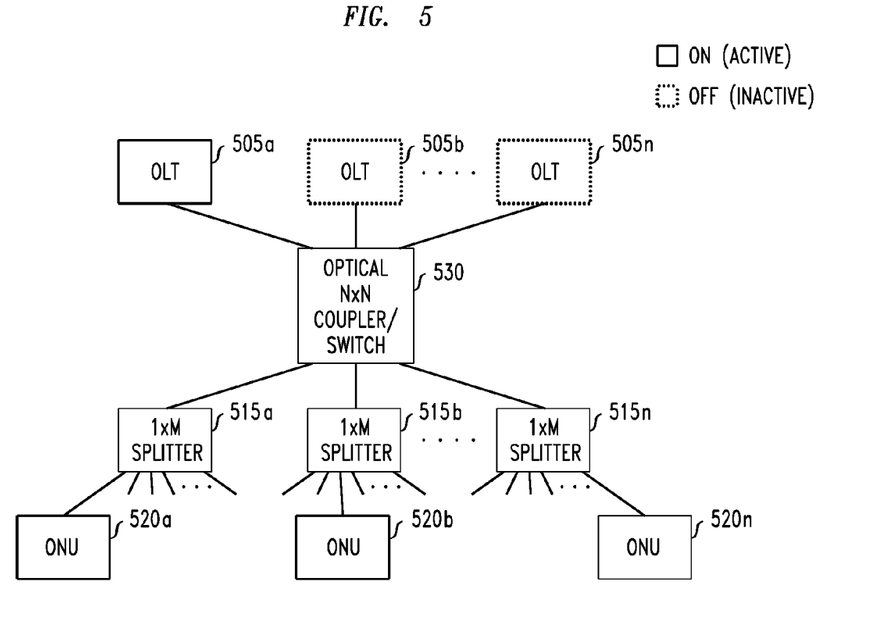
FIG. 5 is a simplified block diagram illustrating selected components of an optical network according to an embodiment of the present invention.

FIG. 5 is a simplified block diagram illustrating selected components of an optical network 500 according to an embodiment of the present invention. Depicted in FIG. 5 is a traffic control switch 530 that is used to switch traffic from a plurality of OLTs, represented here as OLT 505a, 505b, and 505n. Although only three OLTs are depicted, however, as implied in FIG. 5 there could be any number (within the practical limits of the traffic control switch 530). OLT 505a in FIG. 5 is indicated to be powered up, while OLT 505b and OLT 505n are indicated to be powered down. This means that OLT 505a is handling all communications in the upstream and downstream directions for PONs 510a through 510n. (The additional OLTs between OLT 505b and OLT 505n are simply ignored in this example, though they could be on or off) Again, as implied in FIG. 5 there could be any number of PONs driven by OLT 505a within practical limits.

In the embodiment of FIG. 5, each of the PONs 510a though 510n is represented by a respective optical splitter 515a through 515n and a representative ONU referred to as 520a though 520n. Each optical splitter, however, may be and usually is connected to a plurality of ONUs. In FIG. 5, for illustration ONU 520a and ONU 520b are represented as active while ONU 520n is represented as inactive. Note that the active ONUs may both simultaneously receive content transmitted downstream from OLT 505a, but may only transmit upstream at designated times. In this embodiment, the traffic control switch includes a plurality of voltage-controlled optical fiber couplers (not shown), which control the traffic in both the upstream and downstream directions. In this manner, one or more OLTs may be powered down to save energy, while the optical fiber couplers direct traffic to and from the active OLT or OLTs. As explained above, should traffic or other conditions dictate the activation of one or more additional OLTs, the traffic controller will reconfigure the network by adjusting the optical fiber couplers so that each active OLT will handle a selected share of the network communications.

Figure 7:
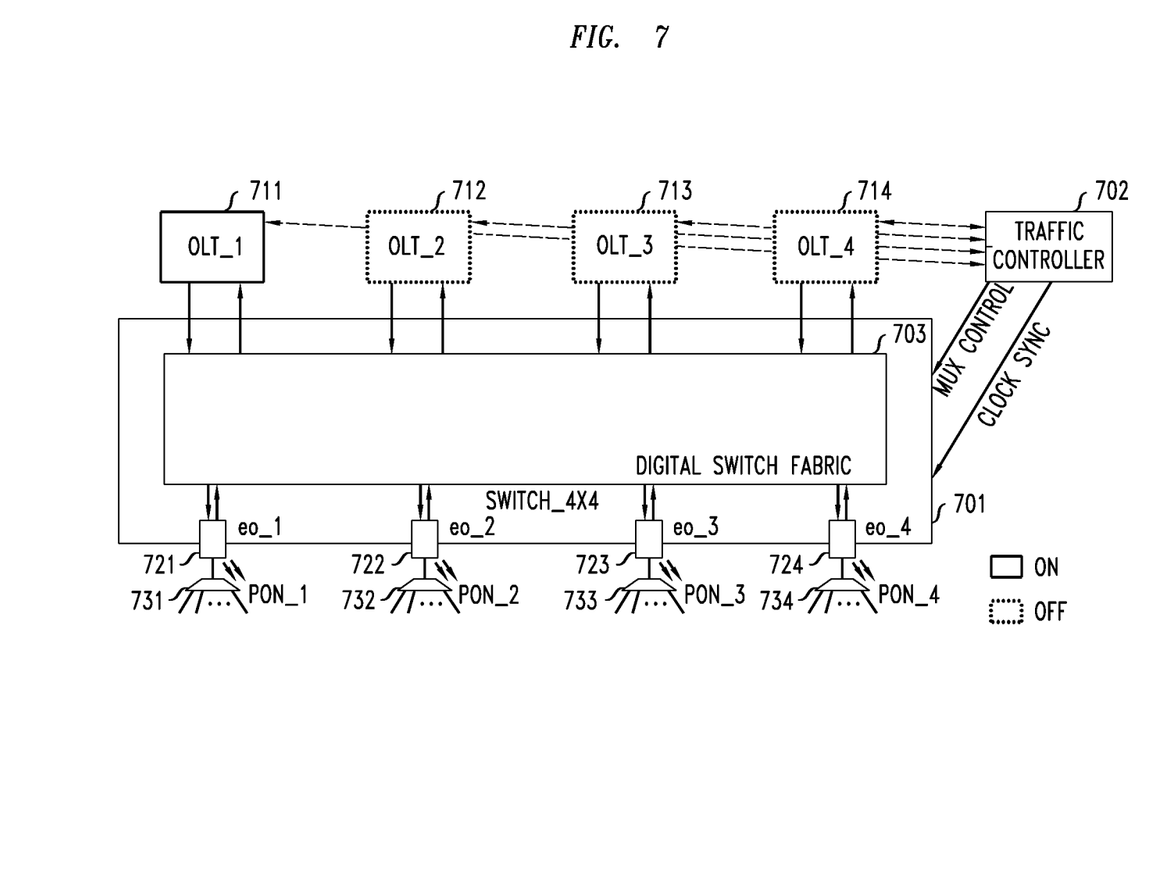
FIG. 7 is a simplified schematic diagram illustrating selected components of an optical network according to an embodiment of the present invention.

In another embodiment, the traffic control switch may be implemented as an electrical switch, the operation of which will now be described in reference to FIGS. 7 through 9. FIG. 7 is a simplified schematic diagram illustrating selected components of an optical network 700 according to an embodiment of the present invention. In this embodiment, each of four OLTs 711 through 714 is in communication with the switch fabric 703 of traffic control switch 701. A traffic controller 702 is in communication with each of the OLTs and indicates, according to a determination made according to the present invention, which OLTs, if any, should be powered down to save energy. In the state represented in FIG. 7, only OLT 711 is powered up for communication with PONs 731 through 734. Each of PONs 731 through 734 is associated with a dedicated electro-optical converter, referred to in FIG. 7 as 721 through 724. Note that for convenience each of the electro-optical converters is represented as a single device for converting electrical signals to optical signals in the downstream direction, for example, using a laser, and optical signals into electrical signals in the upstream direction.

In the embodiment of FIG. 7, these components are part of the traffic control switch 701. As a result, all switching functions associated with the operation of the traffic control switch 701 are performed by digital switch fabric 703 and can be implemented in a single integrated circuit. Interfaces between the digital switch fabric 703 and the OLTs 711-714 as well as the interfaces between the switch fabric 703 and the opto-electronic converters 721-724 are pairs of separate downstream and upstream signals. The circuits in digital switch fabric 703 involved in switching in the downstream path are separate from the circuits involved in switching in the upstream path. This will be described in more detail with reference to FIGS. 8 and 9.

Figure 8:
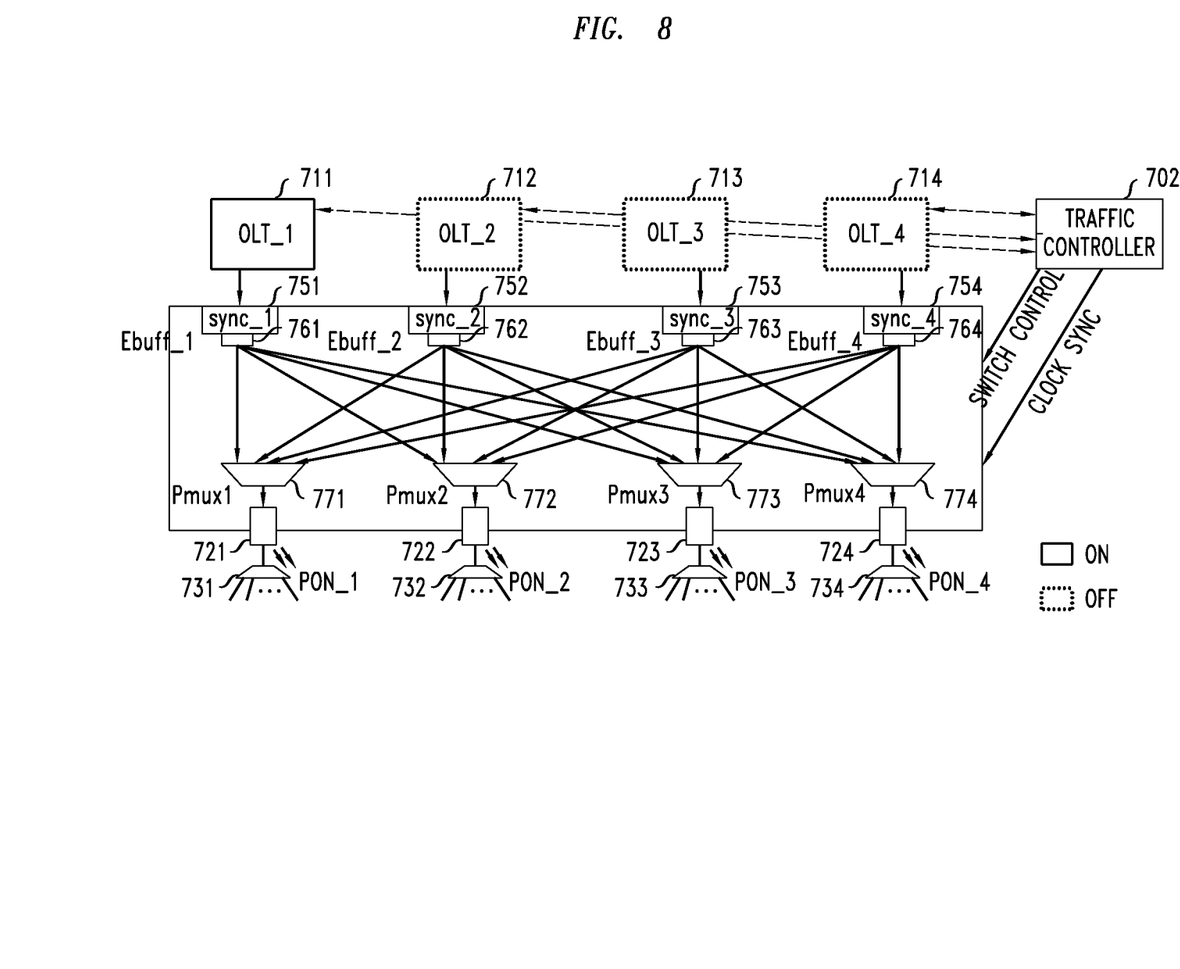
FIG. 8 is a simplified schematic diagram illustrating selected components of optical network for downstream transmission according to an embodiment of the present invention.

FIG. 8 is a simplified schematic diagram illustrating selected components of optical network 700 for downstream transmission according to an embodiment of the present invention. The downstream clocks for all OLTs 711-714 and the traffic control switch 701 are frequency-locked, which is facilitated by the traffic controller 702. The role of the synchronization detectors 751-754 and elastic buffers 761-764 is to enable smooth switch-over between different OLTs in driving each of the PONs 731-734. This is achieved by eliminating a phase shift between the frame bit sequence coming from the driving OLT and the frame bit sequence with which the traffic control switch drives a particular PON.

In this embodiment, synchronization detectors 751-754 are continuously synchronized with the physical synchronization field (PSYNC) at the beginning of the GPON downstream frame coming from their corresponding OLTs 711-714. If, for example, PON 731 is being driven by OLT 712 but the traffic controller 702 issues a command to the traffic control switch to change its configuration such that PON 731 starts being driven by OLT 711 in the following GPON frame cycle, the sync_1 circuit 751, will start storing frame data arriving from the OLT 711 in the elastic buffer 761, starting from the beginning of the following frame. Since the frame start time for all downstream outputs from traffic control switch 701 is adjusted to lag the frame start time for all downstream outputs from all OLTs by a time specified within a certain tolerance interval (for example 8-16 byte times), the elastic buffer 761 will not be empty at the moment when multiplexer 771 starts reading from it (and stops reading from elastic buffer 762). The control state of PON-driving multiplexers 771-774 is changed only when the corresponding PON is required to be driven by a different OLT.

Figure 9:
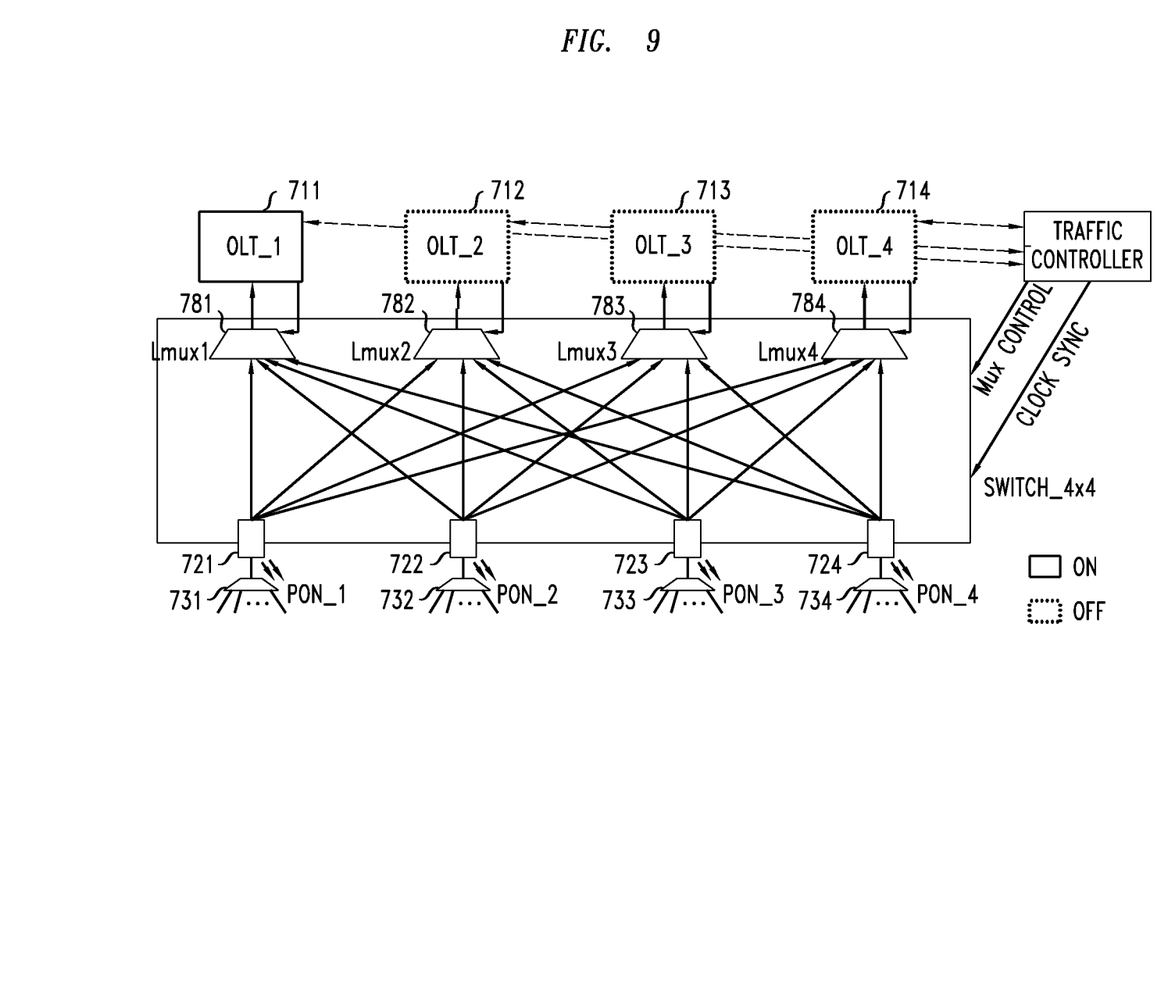
FIG. 9 is a simplified schematic diagram illustrating selected components of optical network for downstream transmission according to an embodiment of the present invention.

FIG. 9 is a simplified schematic diagram illustrating selected components of optical network 700 for downstream transmission according to an embodiment of the present invention. Here again, the traffic control switch is configured such that OLT 711 drives all PONs 731-734, then in every GPON frame period, OLT 711 will be receiving upstream traffic from some or all PONs 731-734. Upstream multiplexer Lmux1 781 will have to select and pass different upstream input in intervals specified by the upstream schedule of OLT 711. The information about the Lmux control state is passed from the OLTs 711-714 to the traffic control switch by control signals from the respective OLT. These control signals may be implemented using separate physical wires conveying real-time signals for the multiplexer, or can be extracted from the OLTs downstream frame in several ways. One way of extracting the control signal would be for the traffic control switch logic to parse the upstream bandwidth map from the downstram frame, Another way would be for the OLT to embed a special message for the traffic control switch in its payload section, for example, at a specified offset from the beginning of the frame. Other methods, as well as some other variations of the mentioned methods, for delivering of the Lmux controls from the OLT to the traffic control switch are possible.

It is further noted that the present invention may be advantageously applied in a fault management scenario. If the failure of one or more OLTs is detected, or of a PANU or communication fiber, the traffic controller may instruct the traffic control switch to route traffic to the PONs using the operational components. In this scenario, of course, the energy-saving features of the invention may also be employed to the extent that enough components are available for satisfactory operation.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of controlling traffic in an optical network, comprising:
   calculating the current network traffic volume;
   calculating the minimum number of optical line terminals (OLTs) required to support the traffic volume,
   configuring a traffic control switch to route traffic to passive optical networks (PONs) in the optical network using only the calculated number of OLTs;
   receiving current traffic information in a traffic controller;
   determining whether the optical network should be reconfigured based on the received traffic information and reconfiguration rules maintained in a rules database at the traffic controller; and
   powering down the OLTs not being used to route traffic.

2. The method of claim 1, wherein the calculation of the number of OLTs required is performed according to rules in the rules database.

3. The method of claim 1, wherein the rules indicate that the network is not to be configured unless the current traffic volume differs from the previously calculated traffic volume by at least a threshold amount.

4. The method of claim 1, wherein the rules indicate that the network is not to be configured unless a certain amount of time has passed since the previous reconfiguration.

5. The method of claim 1, further comprising updating routing tables for a router located in the a central office (CO).

* * * * *